United States Patent

Tuley et al.

[11] 3,918,018
[45] Nov. 4, 1975

[54] LEVEL SENSOR

[75] Inventors: James H. Tuley, Woodley Lane; John Capstick, Southampton, both of England

[73] Assignee: U.S. Philips Corporation, New York, N.Y.

[22] Filed: May 6, 1974

[21] Appl. No.: 467,383

[52] U.S. Cl. .................. 338/28; 29/612; 29/613; 73/295; 340/244 R
[51] Int. Cl.² .............. H01C 7/02; H01C 7/04
[58] Field of Search .................. 338/13–14, 338/22–25, 28, 30, 229, 271; 29/612, 613; 73/295; 340/244 R; 323/68

[56] References Cited
UNITED STATES PATENTS

| | | | |
|---|---|---|---|
| 2,783,341 | 2/1957 | Wisman | 338/22 R X |
| 2,926,299 | 2/1960 | Rogoff | 323/68 |
| 2,959,755 | 11/1960 | Gescey et al. | 338/28 |
| 3,123,790 | 3/1964 | Tyler | 338/28 |
| 3,328,677 | 6/1967 | Naegele | 323/68 |
| 3,701,138 | 10/1972 | Pulliam et al. | 338/25 X |
| 3,772,673 | 11/1973 | Szeverenyi | 340/244 R |

*Primary Examiner*—C. L. Albritton
*Attorney, Agent, or Firm*—Frank R. Trifari; Bernard Franzblau

[57] ABSTRACT

A liquid level sensing device includes a sensing element made of a semiconductor material which exhibits a positive and negative temperature coefficient of resistance mounted in a transistor can. A holder for the transistor can is made of polypropylene and includes a small projection so that the holder can be ultrasonically welded to a polypropylene fluid container. The holder is shaped to allow free flow of the fluid past the transistor can.

18 Claims, 10 Drawing Figures

LEVEL SENSOR

THIS INVENTION relates to liquid-level sensors for sensing the level of liquid in a container.

It is an object of the present invention to provide a liquid-level sensor which is adapted to be manufactured cheaply, is robust, includes encapsulation of the sensing element from the liquid and affords both mechanical protection of the encapsulated sensing element and a free passage for liquid across an outer face of the encapsulated sensing element.

According to the present invention a liquid-level sensor for sensing the level of liquid in a container, comprises:

a. a holder adapted for mounting in the wall of the container, b. a sealed metal can affixed to one side of said holder, c. a sensing element of semiconductor material mounted within the can on a metal end face of the wall of said can, d. electrical leads which protrude from the opposite end of said can adjacent the holder and extend into said one side of said holder, which leads are electrically connected to said sensing element, and e. one or more protective lugs of said holder which project at said one side of said holder at least as far as does said can and which only partially surround the side of said can to define a free passage for liquid across an outer face of the wall of said can.

Embodiments of the present invention will now be described, by way of example, with reference to the accompanying diagrammatic drawings, in which.

Figure 1:
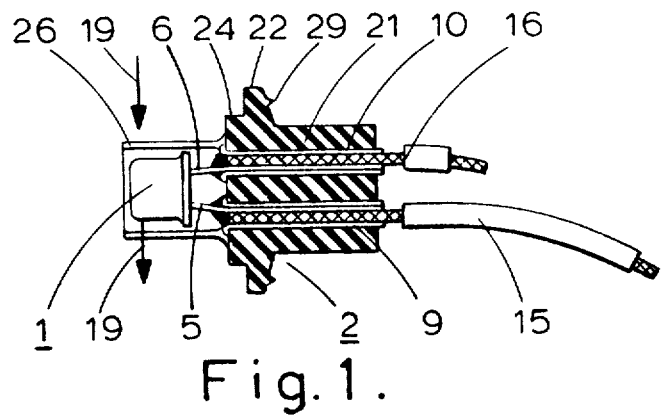
FIG. 1 shows, in partial cross section a level sensor in accordance with the present invention.

Referring now to FIG. 1, the sensor comprises two main component parts, namely an encapsulated sensing element 1 and a mounting part 2 which forms a holder for the encapsulated element 1.

Figure 2:
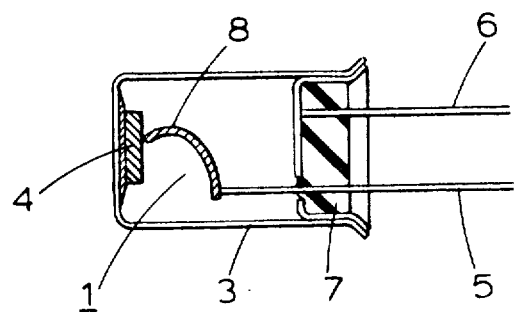
FIG. 2 shows in cross section the encapsulated sensing element of the sensor of FIG. 1.

The encapsulated element 1 is shown in more detail in FIG. 2. The encapsulated sensing element 1 consists basically of a sealed metal can 3 within which a sensing element formed by a piece of semiconductor material 4 is mounted on one end face of the wall of the can 3. Two leads 5 and 6 protrude from a seal 7 at the opposite end of the can 3. The can 3 shown in FIG. 2 is a conventional transistor can, for example of TO-18 outline, but having only two leads. The lead 6 is connected to the metal wall of the can 3 to form one electrode of the sensing element 4, the other electrode of the sensing element 4 being a strip of spring metal 8 which is connected to the lead 5, for example by soldering. The can 3 is made from a metal having a low thermal conductivity such as Kovar and the sensing element 4 is affixed to the bottom of the can 3 by, for example, soldering. The seal 7 may be of any conventional type, for example, glass. In the form shown in FIG. 2, this seal 7 is a conventional TO-18 type header consisting of a metal shell with a glass filling. This metal shell provides the connection between the lead 6 and the wall of the can 3.

Figure 6:
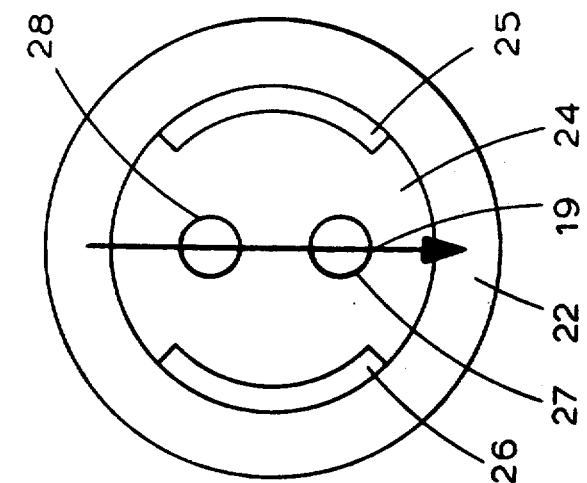
FIG. 6 shows the other end elevation of the mounting part of FIG. 1.
Figure 5:
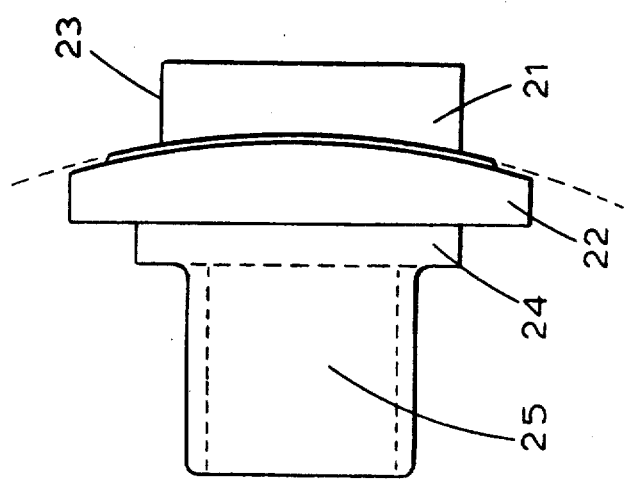
FIG. 5 shows a side elevation of the mounting part of the device of FIG. 1.
Figure 4:
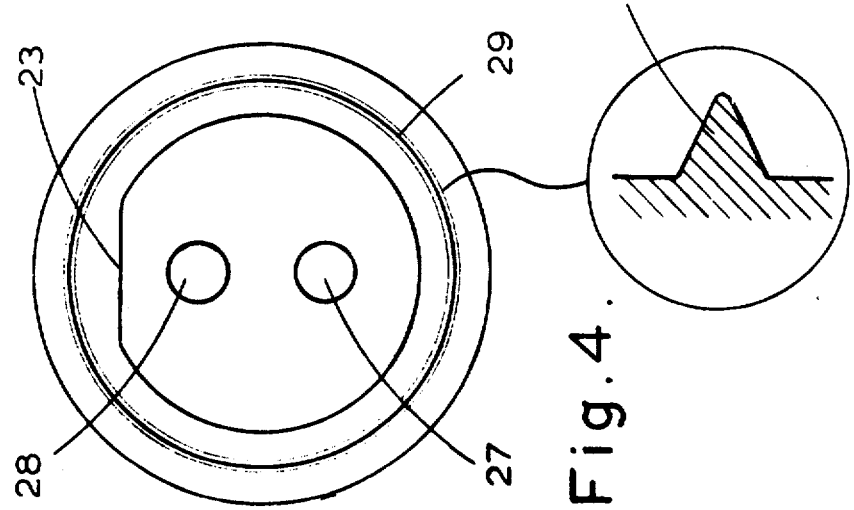
FIG. 4 shows an end elevation of the mounting part of the sensor of FIG. 1.

The holder 2 is shown in more detail in FIGS. 4 to 6 to which reference is now made. The holder 2 may be manufactured from any suitable plastic material or any other insulating material. In a preferred embodiment the holder 2 is moulded from polypropylene. It is possible to make the holder 2 from a conductive material such as a metal but a problem is introduced in that the two leads 5, 6 have to be electrically isolated and also the hole through which the two leads 5 and 6 pass have to be liquid tight.

The holder shown in FIG. 5 is suitable for a container with circular cross section as shown by the dotted line. It is required to be able to insert the holder through a hole in the wall of the container and thereafter to seal the hole. The holder 2 therefore consists of a boss 21 and a shoulder portion 22, the boss 21 being provided with a flat portion 23 (see FIG. 4) to locate the holder 2 in a correct orientation with respect to the fluid container. The holder 2 has a further shoulder 24 onto which are moulded two protective lugs in the form of partial hollow cylindrical portions 25 and 26 (see FIG. 6). The holder 2 is further provided with two holes 27 and 28 bored in an axial direction, these holes being used for the electrical connections to leads 5, 6. As shown inset on FIG. 4 the shoulder 22 is provided with a small projection 29 all around its circumference, which small projection is suitable for ultrasonically welding the holder 2 to a plastics liquid-container.

In a practical arrangement the holder and the liquid-container were made of polypropylene to I.C.I. specification HWM 107.

The assembled device is shown in FIG. 1 to which reference is now made. The first step in the assembly is to insert leads 5 and 6 of the encapsulated element 1 into a pair of eyelets 9 and 10. The connecting leads 15 and 16 are inserted into the eyelets 9 and 10 from the opposite end. A connection between the leads 5 and 15 and the leads 6 and 16 is then made by soldering over the end of the eyelets, thus also forming a fluid tight joint. The eyelets 9, 10 are then forced into the holes 27, 28 in the holder 2, the fit between the eyelets 9, 10 and the polypropylene being such as to give a fluid tight seal. The sensing device is now in the form as shown in FIG. 1. The boss 21 is now inserted through a previously cut hole in the side of the liquid container and pressure is applied to ensure good contact between the holder 2 and the inner surface of the liquid container. The holder 2 is then ultrasonically welded to the liquid container in known manner.

Figure 3:
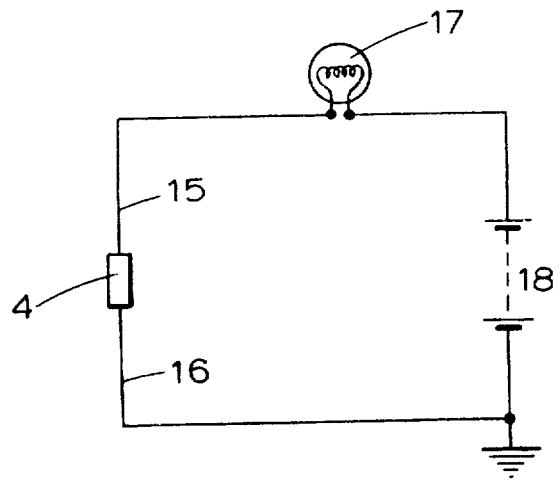
FIG. 3 shows an electrical circuit in which the level sensing device of FIG. 1 can be used.

The sensor is mounted at a position in the liquid container such that the sensing element is normally immersed in the liquid, the level of which is required to be monitored. The leads 15 and 16 are then electrically connected as shown in FIG. 3 to which reference is now made.

The lead 15 is connected in series with a lamp 17 and a battery 18. The negative terminal of battery 18 is grounded and the lead 16 is also connected to ground, so forming a series loop. The circuit functions in known manner. A current passed through the piece of semiconductor material 4 under normal conditions, i.e. when the sensing device is immersed in the liquid, is insufficient to light the lamp 17. If the level of liquid falls below the sensing device, so exposing the sensing element to the surrounding atmosphere, the self-heating effect of the current through the sensing element 4 is no longer counteracted by the cooling effect of the liquid. Thus the element 4 heats up, and as is well known for such semiconductor material as silicon and germanium, as the temperature rises the resistance of the piece of semiconductor material 4 reaches a peak, after which peak the resistance rapidly decreases with a further increase in temperature thus drawing a large current through the lamp 17 which lights the lamp and gives a warning of low liquid level. The maximum current through the semiconductor sensing element 4 is limited by the chosen resistance of the filament of the lamp 17 and the voltage of the battery 18.

FIGS. 4, 5 and 6 and FIG. 1 show a holder 2 suitable for a cylindrical container. It is obvious however that by changing the profile of the shoulder 22 other shapes of container can be used.

The can 3 of the sensing element 1 is in a preferred embodiment made of Kovar. The material Kovar is suitable since its coefficient of conductance is low enough such that cooling takes place only over the bottom of the can 3 and not to any degree over the cylindrical side wall of the can. This enables a reduction to be made in the size of the sensing element 4.

The leads 15, 16 may be replaced by tags with flattened ends formed into spade terminals so that the unit can be plugged in.

The lead 5, which is not connected to the can 3, is required to be insulated from the liquid in the liquid container. This is to prevent any electrolytic action between the two leads 5 and 6 or between the lead 5 and the wall of the can 3. Preferably an insulating coating is provided on both leads 5 and 6 extending between the can 3 and the holder 2.

The lugs 25, 26 are normally orientated in the liquid container by the flat portion 23 on the boss 21 so that a vertical flow of liquid across the end face of the can 3 is possible. Such a liquid flow is indicated by arrows 19 in FIGS. 1 and 6. As shown in FIG. 1 the lugs 25 and 26 project slightly further at the side of the holder 2 than does the can 3. They therefore afford some mechanical protection for the can 3 and its leads 5 and 6, for example when inserting the sensor in the wall of the liquid container.

Figure 7:
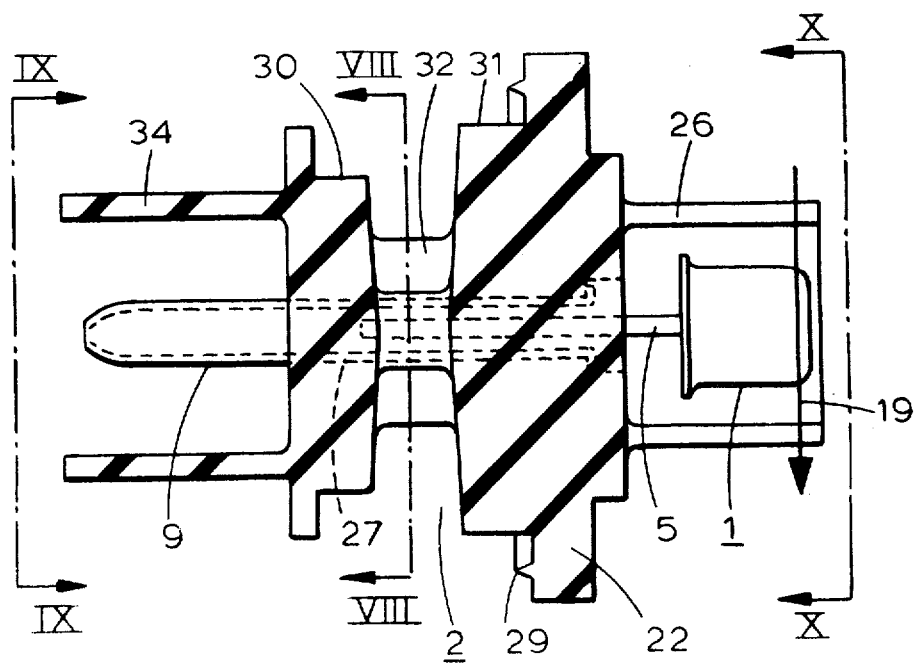
FIG. 7 shows, in partial cross sectional view another level sensor in accordance with the present invention.

A further liquid-level sensor is shown in FIG. 7. Parts of this sensor which correspond to or are similar to parts of the sensor of FIG. 1 are designated by the same reference numerals.

Figure 8:
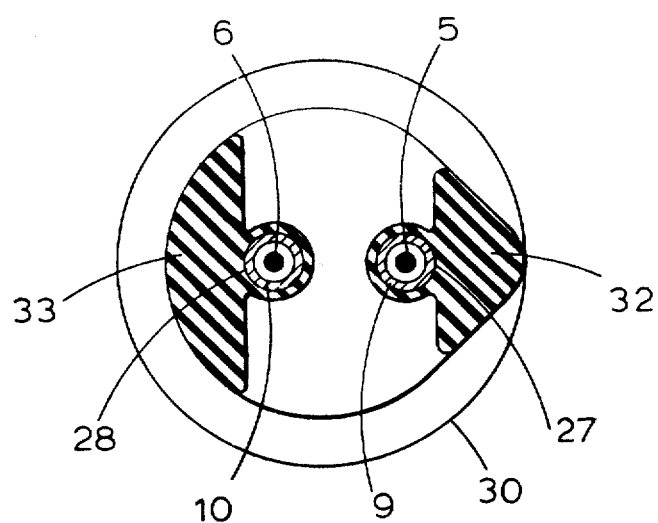
FIG. 8 is a sectional view taken on the line VIII—VIII of FIG. 7.
Figure 9:
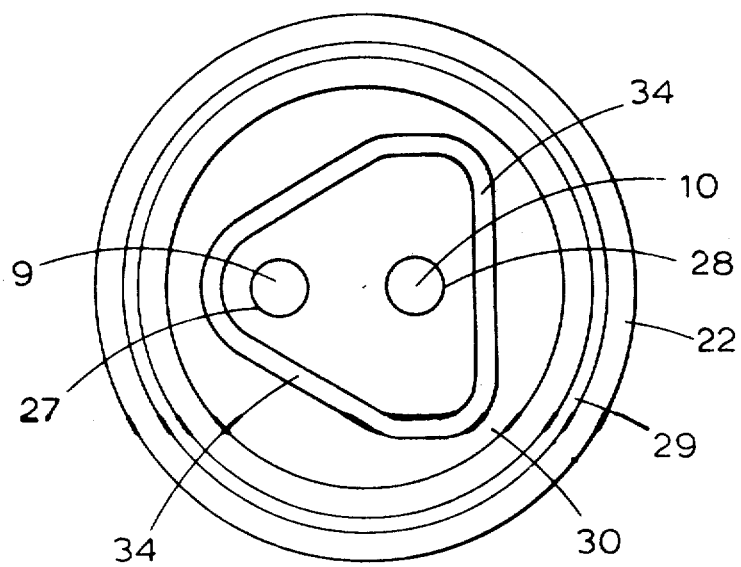
FIG. 9 is an end view of the sensor of FIG. 7 taken on the line IX—IX of FIG. 7.

In this further sensor, as shown in FIGS. 7 and 8, the holder 2 is moulded in the form of two main body portions 30 and 31 connected together by two struts 32 and 33. The long metal eyelets 9 and 10 extend from the side of the holder 2 adjacent the encapsulated element 1, through the struts 32 and 33 to project from the opposite side of the holder 2 where they form device terminal pins of the sensor. A moulded collar 34 is provided on the holder portion 30 assymetrically around the holes 27 and 28 carrying the eyelet terminal pins 9 and 10, see FIGS. 7 and 9. Connection to these terminal pins 9 and 10 can be made by a conventional female-connector contained in a housing which will fit over the collar 34 of the holder 2.

The holes 27 and 28 bearing the eyelets 9 and 10 pass between the main body portions 31 and 30 via thin-walled portions of the struts 32 and 33, see FIG. 8. These thin-walled portions permit the eyelets 9 and 10, where they pass through the struts 32 and 33, to be crimped around the leads 5 and 6 of the encapsulated element 1.

Figure 10:
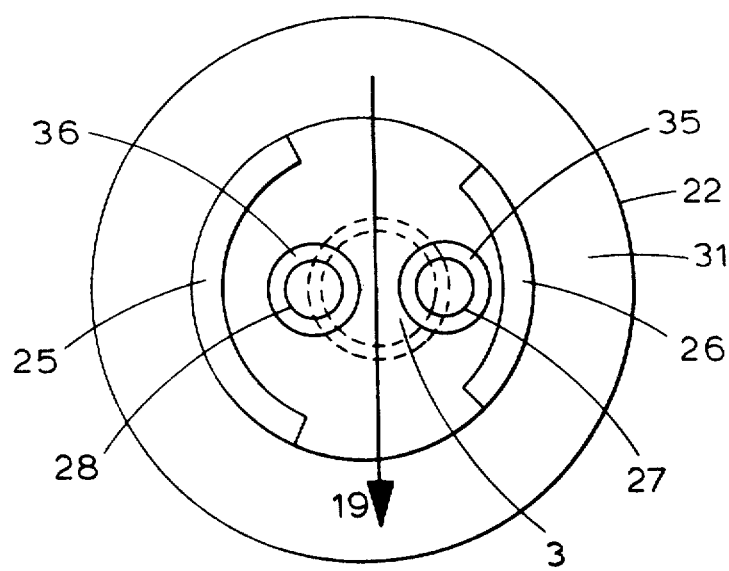
FIG. 10 is an end view of the mounting part of the sensor of FIG. 7 taken on the line X—X of FIG. 7.

FIG. 10 shows the end of the holder 2 at which the encapsulated element 1 is mounted. The position of the element 1 is indicated in FIG. 10 by the broken outline of the can 3. As shown in this Figure, the protective lug 25 is larger than the protective lug 26, and the holes 27 and 28 extend from recesses 35 and 36 provided in the holder 2 for the ends of the eyelets 9 and 10 adjacent the encapsulated sensor element 1.

It will be obvious that many modifications are possible within the scope of the present invention. Thus, for example, the smaller lug 26 may be omitted from the sensor of FIG. 10.

The encapsulation of the sensing element 4 of semiconductor material protects the element 4 from the liquid and permits a heat exchange between the sensing element 4 and the liquid when the liquid is around the sensor. Forms of encapsulation other than a sealed metal can 3 may be used for this purpose. Thus, for example, the encapsulated element 1 may comprise the sensing element 4 of semiconductor material secured between the electrical leads 5 and 6 and encapsulated in a thin coating of glass. The leads 5 and 6 may be soldered to the opposite major faces of the element body 4, after which the surface of the semiconductor body 4 may be coated with the glass to form a layer having a thickness of, for example, 50 microns.

The sensor may be used for a variety of applications, for example sensing the level of hydraulic brake fluid or radiator-water or lubricating oil in automobiles, or the level of water in washing machines. In some applications it may be desirable to add further design features to the holder 2. What is claimed is:

1. A liquid-level sensor for sensing the level of liquid in a container, comprising:
   a. a holder adapted for mounting in the wall of the container,
   b. a sealed metal can affixed to one side of said holder,
   c. a sensing element of semiconductor material mounted within the can on a metal end face of the wall of said can,
   d. electrical leads which protrude from the opposite end of said can and extend into said one side of said holder, which leads are electrically connected to said sensing element, and
   e. at least one protective lug of said holder which projects at said one side of said holder at least as far as does said can and which only partially surrounds the side of said can to define a free passage for liquid across an outer face of the wall of said can.

2. A liquid-level sensor according to claim 1, in which said can is arranged between two diametrically-opposed protective lugs of said holder.

3. A liquid-level sensor according to claim 1, in which said leads extending into said holder affix said can to said holder.

4. A liquid-level sensor according to claim 3, in which said leads where they extend from said can to said holder comprise an electrically insulating coating.

5. A liquid-level sensor according to claim 3, in which said leads extend into long metal eyelets which are present in said holder and which extend from said one side of said holder to the opposite side.

6. A liquid-level sensor according to claim 5, in which said eyelets form electrical terminals at said opposite side of said holder.

7. A liquid-level sensor according to claim 1, in which said holder is of moulded plastics material.

8. A liquid-level sensor according to claim 7, in which said holder includes a shoulder portion having thereon a small projection suitable for ultrasonic welding to the wall of said container.

9. A liquid level sensor for sensing the level of liquid in a container comprising, an insulating holder adapted for mounting in a wall of the container, an encapsulated sensing element affixed to one side of said holder, the sensing element being made of semiconductor material subject only to self-heating by means of a pair of electrical leads electrically connected to said sensing element and protruding from said encapsulation and extending into said one side of the holder, the encapsulation of the sensing element comprising a wall the inner face of which is adjoined by the sensing element to permit heat exchange between the sensing element and the liquid when the liquid in the container is at a level to contact the sensor, and at least one protective lug of said holder which projects at said one side of said holder at least as far as said encapsulated sensing element and which only partially surrounds the side of said encapsulated element to define a free passage for liquid across an outer face of said wall of the encapsulation.

10. A liquid level sensor as claimed in claim 9 wherein the encapsulation material comprises a glass coating that seals the semiconductor material from the liquid in the container.

11. A liquid level sensor for sensing the level of liquid in a container comprising, a holder composed of electrically insulating material and adapted for mounting in a wall of the container, said holder comprising first and second main body portions with connecting struts therebetween, two long metal eyelets extending from said first main body portion to said second main body portion, an encapsulated sensing element fixed to the side of said first main body portion that is remote from said second main body portion, protective means protruding from said side of the holder to provide mechanical protection for said encapsulated sensing element, and two electrical leads protruding from the encapsulation of the sensing element and electrically connected to said sensing element, each of said leads extending into an associated one of said metal eyelets at said side of said first main body portion with said associated metal eyelet being crimped onto said lead between said first and second main body portions to make electrical connection between said leads and their associated metal eyelets.

12. A liquid level sensor as claimed in claim 11 wherein said eyelets protrude from the side of said second main body portion remote from the first body portion to form electric terminals for the sensor.

13. A probe for monitoring a liquid comprising, a sealed metal can, a thermally sensitive semiconductor element housed within said can with one face thereof mounted on an inner face of a metal end wall of the can so as to be in electric and thermal contact with said metal end wall thereby to form a current path in the semiconductor body between the metal end wall and the opposite face of the semiconductor element, said metal end wall permitting heat exchange between the semiconductor element and a liquid contacting the can, a seal in the opposite end of the can for sealing the can against its environment, first and second electric leads protruding externally from the opposite end of the can via said seal, and means electrically connecting said first and second leads to the can wall and to said opposite face of the semiconductor element, respectively, for passing a current through said semiconductor element.

14. A probe as claimed in claim 13 wherein the material of the can walls is chosen to have a relatively low thermal conductivity such that thermal conductance from the semiconductor element through the metal side wall of the can is insignificant relative to that through the metal end wall of the can.

15. A probe as claimed in claim 13 wherein the semiconductor element is mounted on a mass of good thermally and electrically conductive material which extends beyond the edge of the semiconductor element and is in thermal contact with the inner face of said metal end wall under and beyond the semiconductor element.

16. A probe as claimed in claim 13 wherein said electric connecting means includes a spring metal strip with one end contacting said opposite face of the semiconductor element and the other end secured to said second electric lead.

17. A probe as claimed in claim 13 further comprising an electric insulating material coating said first and second electric leads.

18. A liquid level sensor as claimed in claim 11 wherein said connecting struts include thin-walled portions surrounding the two metal eyelets between said first and second main body portions for insulating the metal eyelets.

* * * * *